US008990300B2

(12) United States Patent
Hillier

(10) Patent No.: US 8,990,300 B2
(45) Date of Patent: Mar. 24, 2015

(54) CONSTRUCTING A CONTACT SHARING HISTORY

(75) Inventor: Peter Matthew Hillier, Kanata (CA)

(73) Assignee: Mitel Networks Corporation, Ottawa (CA)

( * ) Notice: Subject to any disclaimer, the term of this patent is extended or adjusted under 35 U.S.C. 154(b) by 388 days.

(21) Appl. No.: 13/591,002

(22) Filed: Aug. 21, 2012

(65) Prior Publication Data

US 2014/0059125 A1    Feb. 27, 2014

(51) Int. Cl.
*G06F 15/16* (2006.01)
*G06Q 10/00* (2012.01)
*H04L 29/12* (2006.01)

(52) U.S. Cl.
CPC ............ *H04L 61/1594* (2013.01); *G06Q 10/00* (2013.01)
USPC .............................. 709/204; 709/217; 705/1.1

(58) Field of Classification Search
CPC ............... H04L 61/1594; H04L 51/16; H04M 1/274508; H04M 1/274516; G06Q 10/107
USPC ................... 709/204, 206, 217, 219; 705/1.1; 715/205
See application file for complete search history.

(56) References Cited

U.S. PATENT DOCUMENTS

| 6,269,369 | B1 | 7/2001 | Robertson |
| 6,691,158 | B1 * | 2/2004 | Douvikas et al. ............. 709/219 |
| 7,007,068 | B2 * | 2/2006 | Morkel .......................... 709/206 |
| 7,062,656 | B2 * | 6/2006 | Richards et al. .............. 713/185 |
| 7,636,719 | B2 | 12/2009 | Thompson et al. |
| 7,836,147 | B2 | 11/2010 | Reding et al. |
| 2004/0024846 | A1 * | 2/2004 | Randall et al. ................ 709/219 |
| 2006/0190557 | A1 * | 8/2006 | Bhogal et al. ................. 709/217 |
| 2007/0260523 | A1 | 11/2007 | Schadt et al. |
| 2010/0088105 | A1 * | 4/2010 | Feldhahn ....................... 705/1.1 |
| 2013/0022030 | A1 * | 1/2013 | Hillier ........................... 370/338 |
| 2013/0247160 | A1 * | 9/2013 | Hillier .............................. 726/7 |

FOREIGN PATENT DOCUMENTS

| EP | 0924917 A2 | 6/1999 |
| WO | WO 01/37161 A2 | 5/2001 |
| WO | WO 2005/027469 A1 | 3/2005 |
| WO | 2009073637 A2 | 6/2009 |
| WO | 2009089084 A1 | 7/2009 |

OTHER PUBLICATIONS

EESR, Dec. 16, 2013.

* cited by examiner

*Primary Examiner* — Wing F Chan
*Assistant Examiner* — Raji Krishnan

(57) ABSTRACT

Technology for constructing a contact sharing history is disclosed. One method comprises receiving, at a computing device of a second user, a communication contact information element of a first user. The contact information is linked to a personal identification key associated with the first user. A link to a personal identification key associated with the second user is added to the communication contact information element to form the contact sharing history. The contact sharing history can then be used to identify how the second user obtained the first user's communication contact information element.

18 Claims, 9 Drawing Sheets

CONSTRUCTING A CONTACT SHARING HISTORY

BACKGROUND

The rapid development of mobile phones and other types of computing devices has significantly enhanced people's ability to communicate. Many people choose to communicate with others throughout the day via telephone, email, text messaging, and social networking.

However, the ability to continuously communicate can also lead to a significant reduction in productivity caused by the many interruptions that can occur when communication is attempted. The ability to identify the person or entity that is attempting to communicate can enhance a person's ability to determine if they want to communicate. However, the mere knowledge of a person or entity's identity may not be sufficient to allow a person to make an informed decision on whether to accept a proposal to communicate.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
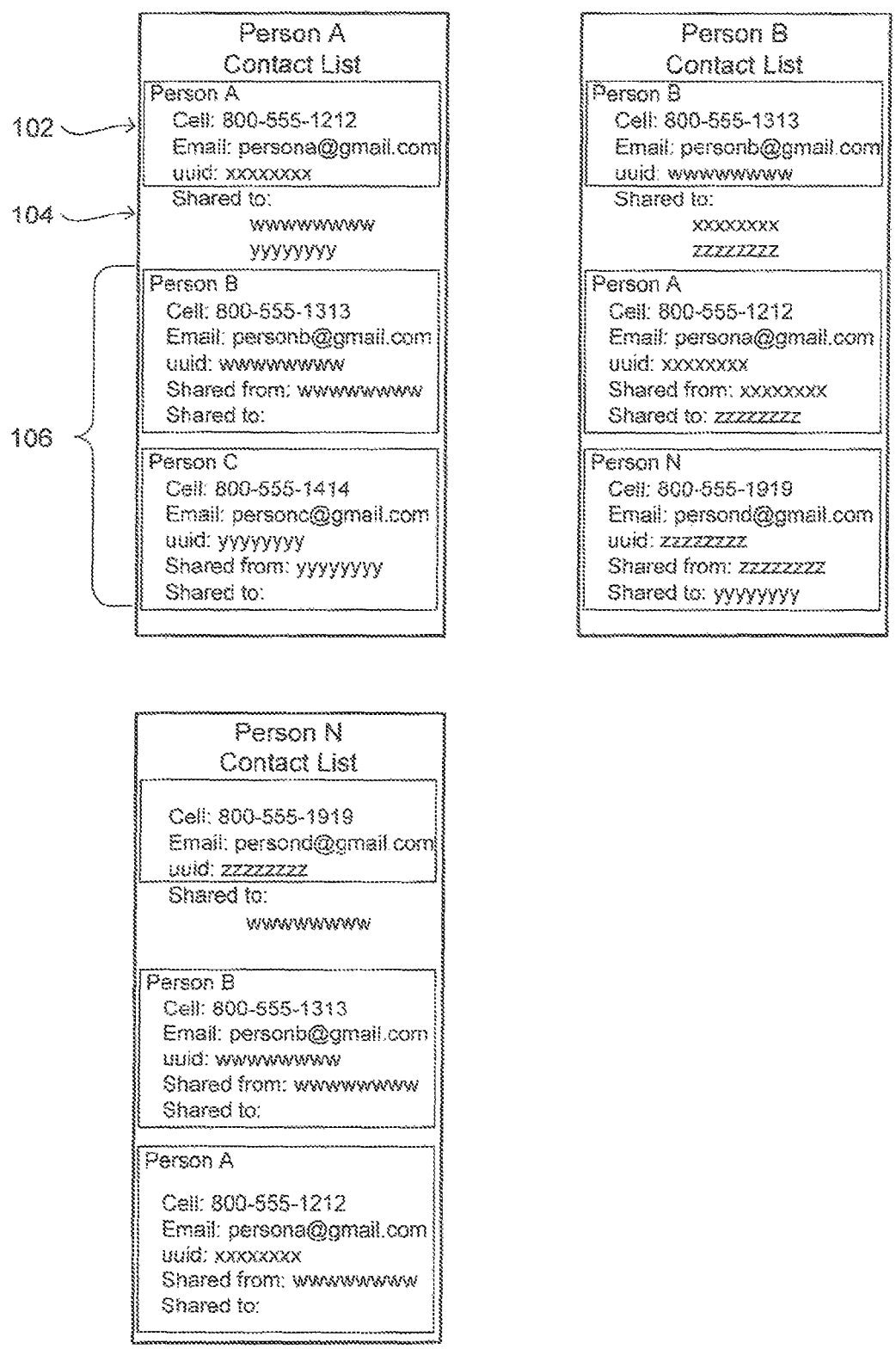
FIG. 1a illustrates a block diagram of an example of a personal contact list with a contact sharing history for bidirectional communication in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "mobile computing device" refers to a computing device capable of wireless digital communication such as a smart phone, a tablet computing device, a laptop computer, a multimedia device such as an IPod Touch®, or other type computing device that provides text or voice communication.

As used herein, the term "communication contact information" refers to information used to send a voice or text communication to a selected person. The term is inclusive of a person's phone number, email address, social media identity, instant messaging identity, or another desired form of communication. The communication contact information is typically used to route the text or voice communication to the selected person. The communication contact information can include underlying layers that are not visible to a user. For example, an internet protocol (IP) address may be used as an underlying layer to send a social media or instant messaging communication. However, a person's name may be displayed as having sent the communication. Similarly, in voice calls, a name may be displayed in a caller ID display, instead of the person's phone number that is used to route the telephone call.

As used herein, a "server" refers to a physical computer dedicated to running one or more service programs used to serve the needs of programs running on other computing devices that are in communication with the server. The service program(s) can serve the needs or requests of other programs which may or may not be running on the same computer. A server can be a system comprised of software and hardware that is dedicated to a specific purpose such as a database server, a file server, a mail server, a print server, a telephony server, a credentials server, and so forth. Alternatively, a single server can be used to provide multiple services.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The increased use of mobile computing devices has significantly increased both the ability to communicate and the variety of formats in which a person can communicate. The use of voice communication and text communication, including email, text messaging (i.e. Short Message Service), instant messaging, and social networking, allows a person to communicate with other persons in any number of ways, at substantially any time. The use of nearly ubiquitous mobile communications means that a person can communicate virtually at any time and place.

However, receiving a proposal to communicate, such as ringing phone, an email, a text message, or an instant message request, can often interrupt a task that was being performed when the proposal arrived. For instance, a phone call or other form of communication may arrive during a meeting. An identity of the proposing party can be critical in enabling the receiving party to make an informed determination on whether to accept the proposal to communicate, and actively engage in communication with the proposing party.

When a phone call is received, the use of caller identification, which is commonly referred to as "Call Display" or "Caller ID", can be helpful in identifying the calling party. However, the use of caller identification is not helpful if the person receiving a phone call does not know or recognize the identity of the caller from a display of the information presented in the caller identification.

In accordance with one embodiment of the present invention, additional information can be provided in a communication to enable a calling party to be identified. More specifically, the additional information can be used to identify how the calling party received a person's contact information, such as a telephone number, email address, or other type of communication contact information. Thus, even if a person does not recognize the person or entity proposing to communicate, the ability to determine how the person or entity obtained the communication contact information enables a more informed decision to be made as to whether to accept a proposal to communicate at the time it is received. In addition, the ability to determine how the person obtained the communication contact information can enhance the ability to block unwanted contact, or accept contact from unknown parties. This will be described more fully in the proceeding paragraphs.

Several instances are provided herein of examples for identifying how a person's communication contact information can be shared and tracked. As used herein, the reference to generic names or identifiers, such as Person A, Person B, and Person C, is used for example purposes only and is not intended to be limiting by number or by order, unless otherwise stated. An unlimited number of persons may be referenced by referring to Person N, where "N" is used as a generic positive integer inferring that any number of persons may be used in the example.

In one example embodiment, each time a person's communication contact information is shared additional information can be added to or associated with the person's communication contact information. The additional information can show a chain of ownership of the communication contact information. The term ownership, as used herein, does not denote any legal form of ownership. Rather, it is merely used to denote the reception and/or transmission of a person's communication contact information. The additional information can then be used to display a chain of ownership for the person's communication contact information whenever a communication is made.

In accordance with one example, a personal identifier can be embedded in a person's communication contact information that is stored in an electronic communication device. The electronic communication device may be a fixed device, such as a desktop computer or business telephone, or a mobile computing device, such as a laptop, smart phone, tablet computer, and so forth.

The personal identifier can be a unique form of hardware identification on the communication device where the communication contact information is stored or created. For example, the International Mobile Equipment Identifier (IMEI) of a mobile communication device, a media access control (MAC) address, a Bluetooth® address, or other hardware specific identification value may be used. The personal identifier will typically not refer to publicly known information that can be easily reproduced to allow a personal identifier to be hijacked or used for unintended purposes. Alternately the identifier can be created from a centralized distributor to insure uniqueness. However it is derived, the identifier can be configured such that a user only knows his or her own identifier. The contact sharing identifier is typically not exposed in any manner outside the application itself In addition to a personal identifier, the communication contact information may be "signed" with an electronic signature, such as a security key or other form of digital certificate that allows the user to always recognize herself or himself as the root source of the contact. The additional electronic signature is optional. The signature can be employed to insure that a person's communication contact information is not unintentionally copied. It can also be used to allow third parties who receive the contact information to verify its authenticity programmatically with the user's device. For example, before User B stores the contact of User A, the contact application of User B can automatically (or on demand by a user) contact the "owner" of the contact (User A) for authentication. User A's device can decrypt the identification block (signature) using the security key and validate the personal key. This can be done at storage time or even at call setup time.

The communication contact information can be shared with other individuals to allow the individuals to send voice, text, or other forms of digital communications to a selected computing device. The selected computing device is typically the computing device from which the communication contact information is shared. For example, a smart phone may be used to share the communication contact information that allows an individual to send a digital communication to the smart phone, such as a telephone call, an email, a text, an instant message, and so forth.

Alternatively, the communication contact information can be shared from a first computing device, and the communication contact information can enable communication to be sent to a second computing device that is different from the first computing device. For example, the communication contact information can be shared from a desktop computing device that includes contact information for a smart phone, such as a phone number or email address, or other form of contact information.

A personal identifier for the second computing device, such as the smart phone, can be included in the communication contact information. An electronic signature may also be included. In one embodiment, the communication contact information may be created on the first computing device, with the personal identifier incorporated at the time of creation. A user can then send the communication contact information to other devices, such as his or her desktop computing device. The communication contact information may be electronically packaged to allow the communication contact information, containing the contact information (i.e. phone number, email, etc.), the personal identifier, electronic signature, and other desired information to be communicated in a single package. The package may be referred to as a communication contact information element.

The communication contact information element, including the personal identifier, can be shared or otherwise communicated in any number of ways, such as via an email, text, instant message, or through a proprietary connection such as a near field communication (NFC) connection, a Bluetooth® connection, or some other form of digital connection that allows the data in the communication contact information element to be transferred from one computing device to another computing device. In one embodiment, an application operating on the sending computing device can write the recipient's personal identifier into the sender's personal contact to denote a "share".

FIG. 1a provides one example illustration of a contact list that is configured to display a chain of ownership of communication contact information 102. The contact list may be accessed on a computing device. Each computing device can store a share history that is relevant to the device user. The ability to store the share history allows bidirectional contact sharing to take place.

Each contact list provides contact information, such as phone numbers, email addresses, and so forth, for the user of the contact list, as previously discussed. The contact list also provides information regarding to whom the user has shared their contact information with. In this example, the "Shared to:" field 104 is populated with a "personal identifier" string. The string can be any digital or alphanumeric value associated with the unique form of hardware identification on the communication device where the communication contact information is stored or created, as previously discussed. The personal identifier string is labeled as a universally unique identifier (uuid). This is not intended to be limiting. The personal identifier string can have any desired format that enables the information to be shared with others. In one embodiment, the uuid can be resolved to an address, such as an IP address, of the computing device containing a contact database that contains the communication contact information. The uuid is illustrated as an alphanumeric value of eight letters in this example. This is also not intended to be limiting. The personal identifier string can have any desired length. Each uuid can be associated with a selected person or entity.

The contact list can also include a communication contact information block 106 for each person from whom communication contact information is received. For each other contact in a user's contact list, the contact information includes personal identifier information (such as the "personal identifier" string) regarding with whom the communication contact information was obtained from, and with whom the communication contact information was shared with.

In the example of FIG. 1a, Person A has shared her communication contact information with Person B (uuid: wwwwwwww) and Person C (uuid: yyyyyyyy). In addition, Person B and Person C have each shared their communication contact information with Person A. Person A has not shared Person B or Person C's contact information with anyone else.

Similarly, in person B's contact list, it can be determined that Person B has shared his contact information with Person A and Person N. Similarly, Person A and Person N have shared their contact information with Person B. In addition, Person B has shared Person A's contact information with Person N; and Person N's information with person C.

Person N's contact list shows that Person N has shared their communication contact information with Person B. Person N has also received the communication contact information of Person B from Person B, and the communication contact information of Person A from Person B.

When Person A communicates with Person B, the communication contact information can be used to inform Person B where Person A obtained his or her communication contact information. For example, when Person A calls Person B, information can be displayed, prior to Person A accepting the call, showing that Person B is calling, and that Person B received Person A's communication contact information directly from Person A. Similarly, when Person N calls Person A, information can be displayed, prior to Person A accepting the call, showing that Person N is calling, and that Person N received Person A's communication contact information from Person B. Based upon this information, Person A can decide whether to take the call. In this example, person A does not know who person N is, and they do not have a contact entry for person N.

The additional information can also be used to provide more options for electronic screening of incoming communications. For example, Person A can setup a rule to allow all telephone calls and emails if Person A's communication contact information was shared by herself, or by Person B. Alternatively, if the communication contact information was shared by another person, such as Person C, then a rule can be set to send telephone calls to voice mail. A wide variety of different rules can be created to filter incoming communications, as can be appreciated.

Similarly, when an email is received, a field can show a chain of ownership of the person's communication contact information. A person can filter received email based on the information in the chain. In one example, only emails that are received from people in the chain of ownership that have been approved will be sent to the inbox. If a person in the chain of ownership is not approved, then the email may be sent directly to a junk email box. The ability to create a filtering rules based on who shared a person's communication contact information significantly increases a person's ability to filter incoming communications. This can reduce the disruptions that can occur each time a communication is received, thereby increasing a person's efficiency.

While examples have been provided regarding telephone calls and email, the examples are not intended to be limiting. Similar filtering can be accomplished in other forms of communication, such as text messaging, instant messaging, social networking, and the like.

Using the information in each contact list, the distribution of each communication contact information (i.e. the chain of ownership) can be viewed as a data tree, referred to herein as a sharing tree. For example, in FIG. 1b, a sharing tree is illustrated for the communication contact information of Person A. The sharing tree shows that Person A's communication contact information was shared by Person A to Person B and Person C. Person B then further shared Person A's communication contact information with Person N, as previously discussed. The information contained in each contact list can enable a user to determine how his or her communication contact information was shared.

The computing devices containing the contact list can be configured to allow the information to be obtained in a bidirectional manner. In one embodiment, the ability to obtain communication contact information from a contact list in a bidirectional manner is dependent on the ability of each computing device to resolve a uuid to a user or device. The uuid may contain an address of the device, or some centralized location where this information can be obtained, such as a server. This will be discussed more fully in proceeding paragraphs.

At any given time, a user may query his or her own personal contact to obtain a list of identifiers that can be used to identify people to whom the user has shared their own contact with. For example, each personal identifier string can reference a local contact within the contact list itself, when such contacts are available. In a bidirectional exchange of information, such as where Person A provides her contact to Person B, and Person B provides his contact to Person A. Such a bidirectional exchange could imply that the personal identifier string are merely a reference to the contact itself, thereby simplifying the implementation and essentially rendering the personal identifiers to a local scope.

When a third party shares a person's communication contact information, two possibilities can occur. In a first possibility, the third party share can proceed recursively as previously described. For example, Person A can share her communication contact information with Person B, who then shares it with Person C. Person C will now have Person A's contact in his contact list. Embedded inside the communication contact information is Person A's personal identifier, person B's personal identifier, and Person C's personal identifier. At this point, if Person C attempts to contact Person A, Person A can receive a notification such as "Person A→Person B→Person C". Within Person B's computing device, Person A's communication contact information now also includes Person C's personal identifier (because B shared A's contact with C). This allows Person A to track, via Person B's computing device, who Person B has shared Person A's communication contact information with. This information can be used to leap to Person C's phone to further view Person C's sharing history of Person A's contact. (Stated simply, a user can effectively "crawl" through other devices that contain their contact to view the sharing history of their contact. The user can always have access to his or her own contact, even when stored in another device).

In another embodiment, a third party share can result in an update to the original sharing party's entry within the original sharing party's personal contact list. When Person B initiates a share of Person A's communication contact information with Person C, Person C's personal identifier can be communicated to Person A and added to Person A's communication contact information. This allows Person A to immediately determine who has shared her communication contact information without the need for communication with third party devices. This can be beneficial since other devices may be unreachable at the time of a query. It also removes intermediate devices from a share history chain, thereby providing that leaf nodes (i.e. devices containing Person A's contact information in this example) are only obtainable from Person A's computing device.

Figure 1B:
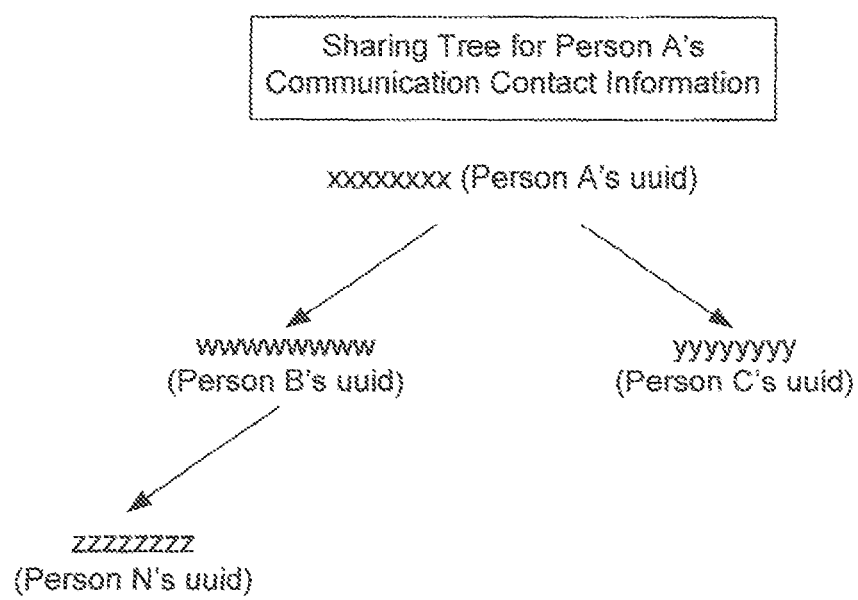
FIG. 1b illustrates a sharing tree for a communication contact information element in accordance with an embodiment of the present invention.

For example, in the sharing tree of FIG. 1b, Person A does not have an entry for Person N. The sharing is determined by looking into Person B's device to learn who Person N has shared the contact with. In one embodiment, rather than require access to Person B's device to see who he shared the contact with, the contact application of Person N can send this information to Person A at the time the sharing was executed. Thus, rather than crawling across devices and learning the share history for a user's communication contact information, the data can be accumulated directly within a user's device as people share it.

If the originating computing device is not available, then the sharing information may be temporarily stored at another location, such as on a server. Once the originating computing device is available, the sharing information can be communicated by the server to the originating computing device. Alternately, the user may be prevented from using the contact until the originating computing device is contacted/updated.

The embodiment described in the preceding paragraphs implies that the communication contact information originates with the first sharer, such as Person A in the previous example. Each person who participates in this embodiment can have a contact manager module operating on the person's computing device. The contact manager module can access the person's communication contact information that includes the person's personal identifier. In one embodiment, the unique personal identifier can be a local reference to the person's personal contact in a contact list on the person's computing device.

Figure 2:
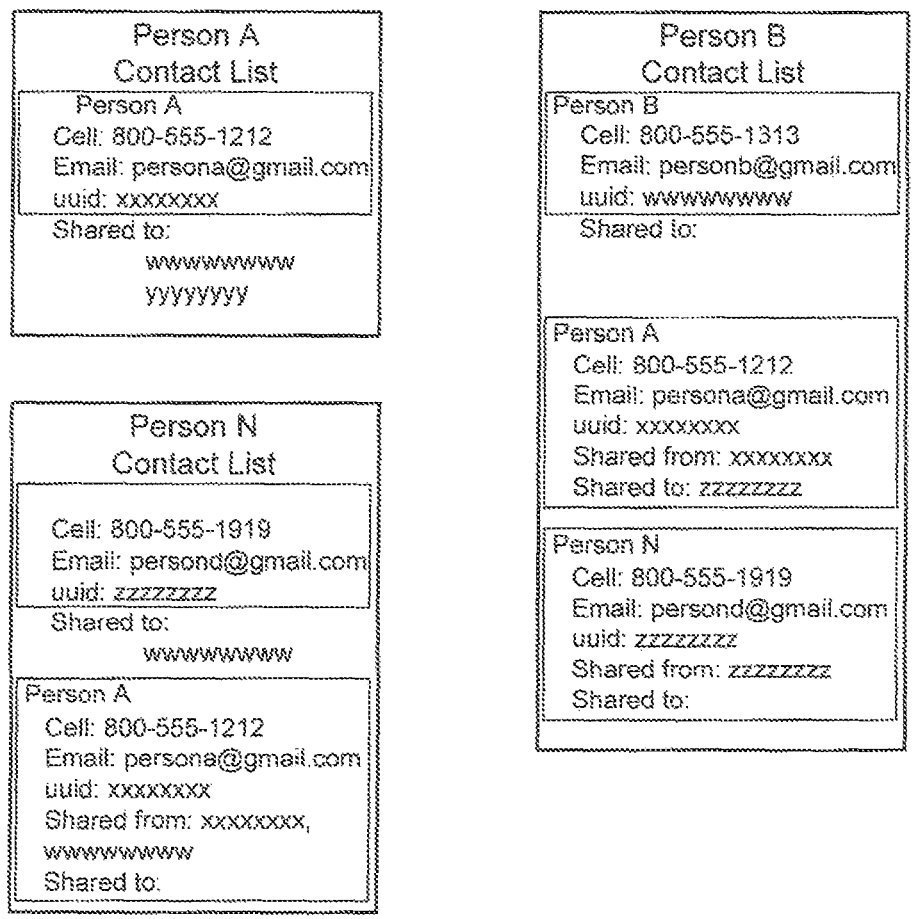
FIG. 2 illustrates a block diagram of an example of a personal contact list with a contact sharing history for unidirectional communication in accordance with an embodiment of the present invention.

In another embodiment, FIG. 2 provides an example illustration of a contact list that is configured to display a chain of ownership of communication contact information. The contact list may be accessed on a computing device. Each computing device can store a share history that is relevant to the device user. In FIG. 2, Person A has shared their communication contact information with Person B and Person C (not shown). Person A has not received any communication contact information from anyone. Person B has not shared his or her communication contact information with anyone. Person B has received the communication contact information of Person A and Person N from Person A and Person N, respectively. Person B has also shared Person A's communication contact information with Person N. A sharing tree for Person A is the same as is illustrated in FIG. 1b.

In a unidirectional embodiment, a local computing device may not be able to resolve the uuid to a local contact. Thus, the uuid has to be obtained from the computing device from which the contact was shared. In the unidirectional embodiment, if Person A shares her communication contact information with Person B, then Person A can obtain Person B's communication contact information. The contact sharing application can then link the Person A and Person B's contacts together in each of their communication devices. Person A can have a full view of who the Person B is, since Person B's uuid in Person A's communication device actually points to Person B's contact entry.

In the unidirectional view, all Person A knows is Person B's uuid (which does not resolve to anything local on Person A's device). Person B's identity is essentially hidden. When Person A shares her communication contact information with Person B, Person B's contact sharing application simply returns Person B's uuid as a reference. To determine the sharing history, Person A needs a mechanism to resolve the uuid to Person B's identity. In one embodiment, a server can be used to resolve this information. The contact data can be stored in the server, and accessed by using the uuid as a key. This allows a user to centrally control their contact information. For instance, Person A can change her phone number, email address, etc. on the main server, and the next time Person B tries to contact Person A, the uuid in Person B's phone will insure the correct up to date contact information for Person A is used.

Figure 3:
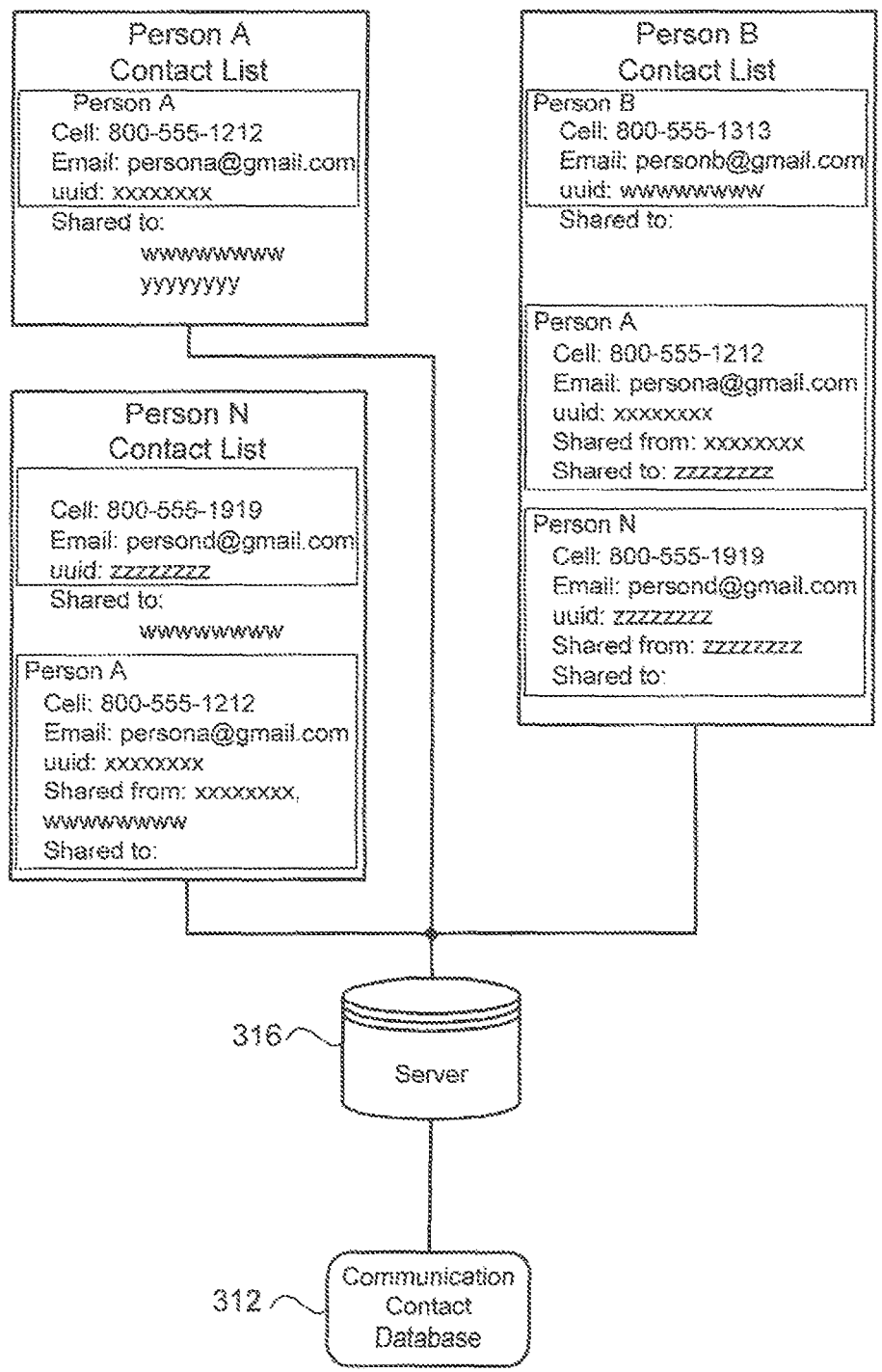
FIG. 3 illustrates a block diagram of an example of a personal contact list with a contact sharing history when using a server to contain the sharing history in accordance with an embodiment of the present invention.

FIG. 3 illustrates an example illustration of a contact list that is configured to display a chain of ownership of communication contact information. However, in the embodiment illustrated in FIG. 3, the information displayed in the "Shared from:" and "Shared to:" fields is not stored locally on a computing device. Rather, this information is stored in and provided by a server 316. In one embodiment, a communication contact database 312 can reside on the server. The database can contain information that allows each computing device to identify the communication contact information that is shared, with whom the communication contact information has been shared and who shared the communication contact information. This information can be used to build a database tracking share history. This information can be displayed when a telephone call or other form of communication is received at a computing device to allow a user to determine whether to proceed with the communication, as previously discussed. By storing the shared to and shared from information on one or more servers that are accessible to the computing devices, it can reduce the amount of communication between devices.

In one embodiment, the exchange and update of keys, such as the personal identifier and/or the electronic signature is only permitted to authorized users. The authorized users may be listed in a centralized database in the communication contact database 312 that resides on the server 316. In another embodiment, a user may be authorized through a peer to peer authentication process in a communication network.

Figure 4:
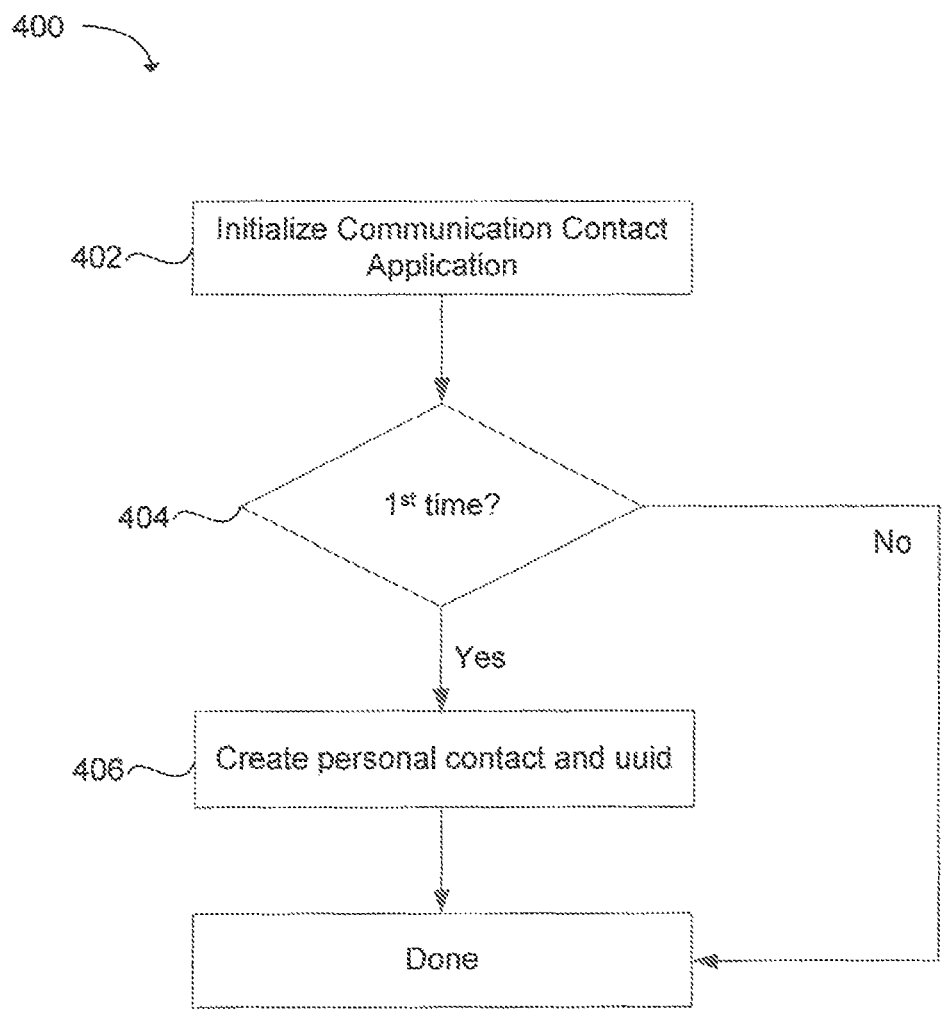
FIG. 4 depicts a flow chart of a process for creating a communication contact information element in accordance with an embodiment of the present invention.

FIG. 4 illustrates an example process 400 for the creation of a user's communication contact information on the user's computing device. In this example, a communication contact application is assumed to be loaded and operate on the user's computing device. In step 402, the communication contact application is initialized. If it is the first time that the communication contact application has been initialized, as shown in step 404, then the user's personal contact information can be entered and associated with a uuid, as shown in block 406. The communication contact information can comprise the personal contact information associated with the uuid. The creation of the communication contact information completes the process.

Figure 5:
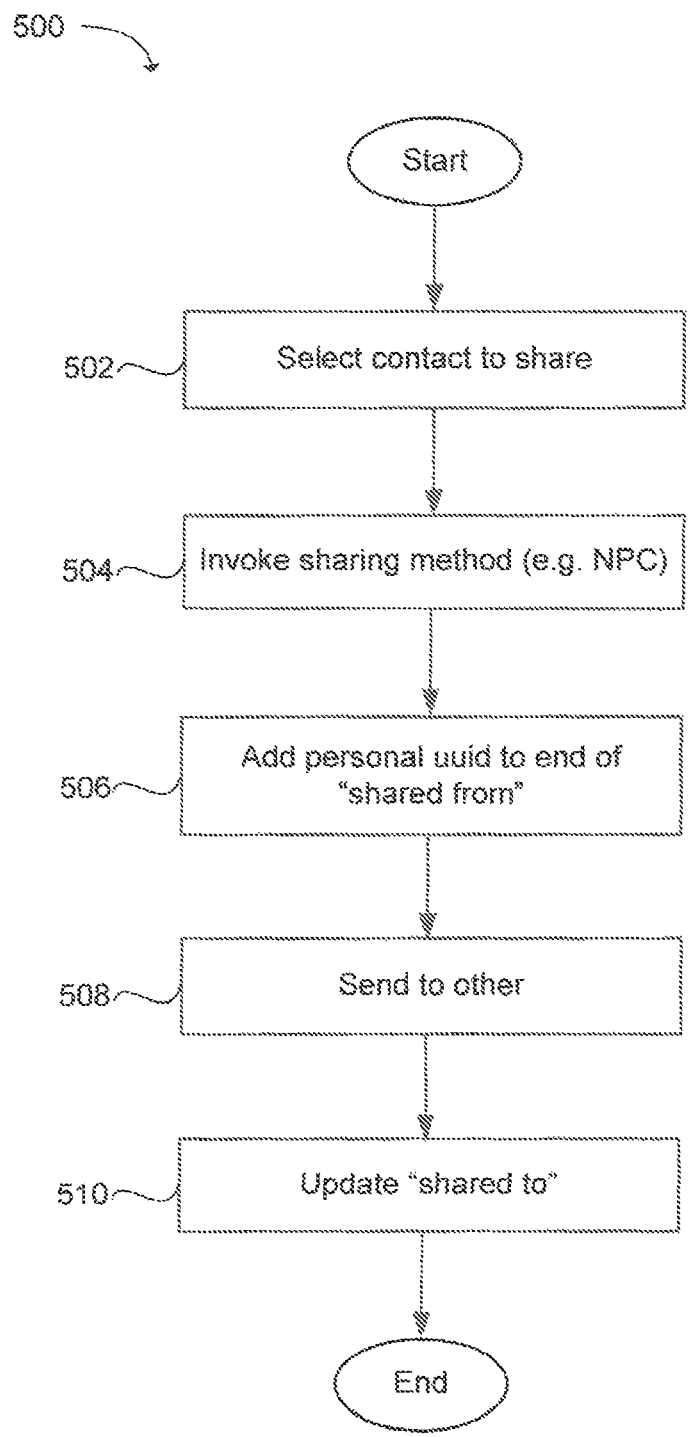
FIG. 5 depicts a flow chart of a process for sharing a communication contact information element in accordance with an embodiment of the present invention.

FIG. 5 illustrates an example process 500 for sharing a communication contact information element. The process allows the chain of ownership to be tracked, thereby enabling the chain to be displayed when a communication is attempted. In the example of FIG. 5, a user can select a contact to share, as shown in block 502. The contact may be the user's contact, or another contact on the user's computing device. A method for sharing can be invoked, as shown in block 504, such as via a wired or wireless connection with another computing device. In block 506, a personal identifier, such as a uuid, can be added to the end of a "shared from" list for the selected contact. The contact can then be shared with another in block 508. In block 510, the "shared to" field can be updated.

Figure 6:
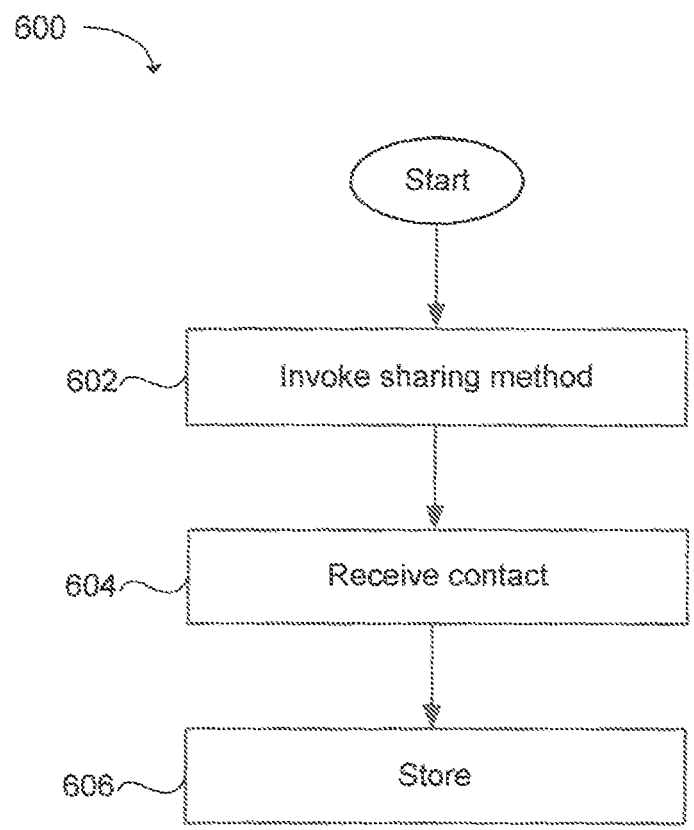
FIG. 6 depicts a flow chart of a process for receiving a communication contact information element in accordance with an embodiment of the present invention.

FIG. 6 illustrates an example process 600 for receiving a communication contact information element. In block 602, a sharing method can be invoked. The sharing method may be selected by the sending computing device. Alternatively, the sending and receiving computing devices can agree upon a sharing method, such as an Institute of Electronics and Electrical Engineers (IEEE) 802.11 peer to peer (P2P) connection. Once a connection has been established between two computing devices, the communication contact is shared 604, and can be stored 606. As previously discussed in FIG. 5, the "shared from" field and "shared to" field can already be updated by the sending computing device. Alternatively, the "shared from" and "shared to" fields may be updated by the receiving computing device.

Figure 7:
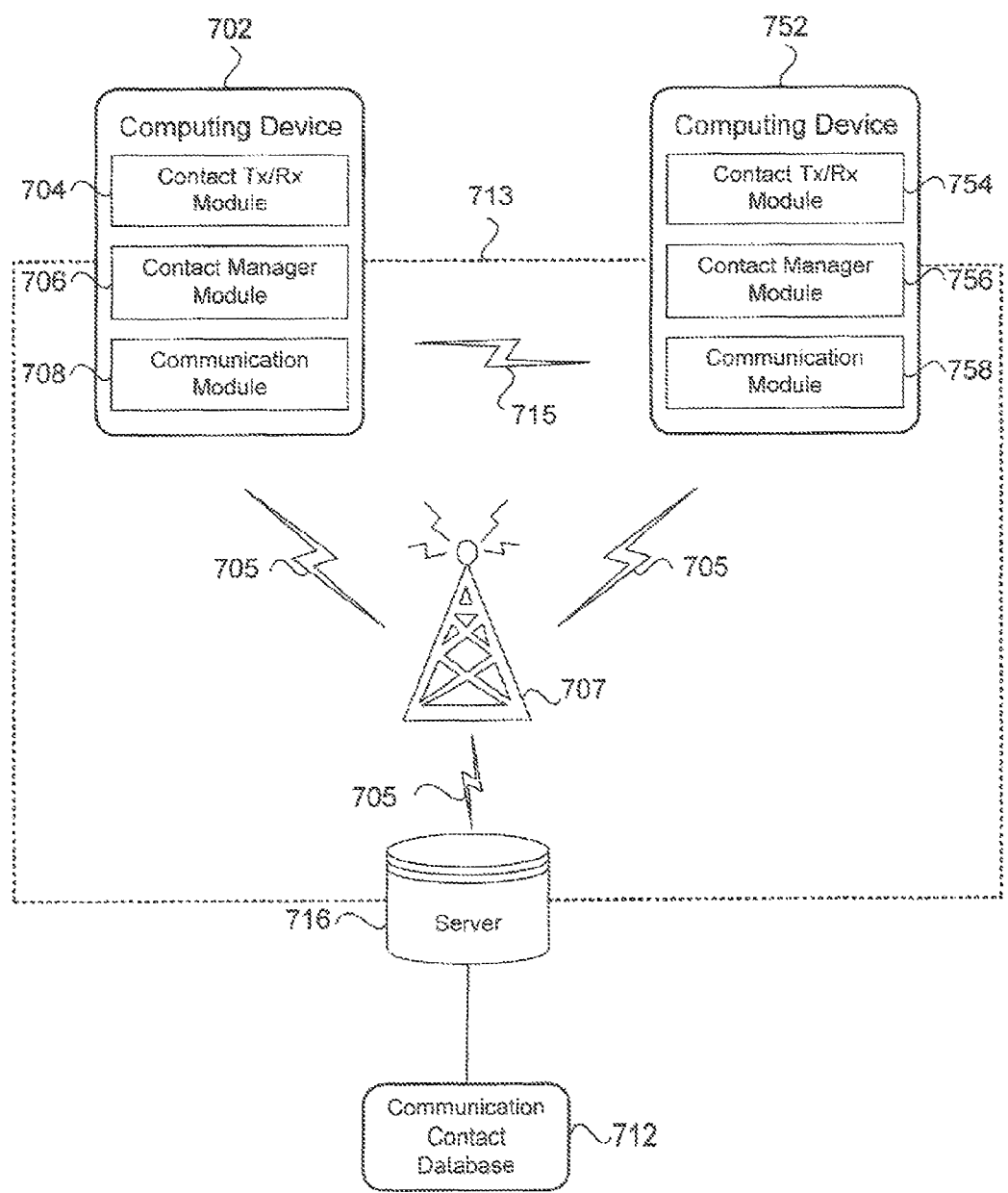
FIG. 7 illustrates a block diagram of a system for constructing a contact sharing history in accordance with an embodiment of the present invention.

FIG. 7 provides an example illustration of a software and/or hardware application that can be configured on each of the sending computing device and the receiving computing device to enable the transfer of the communication contact information. In accordance with one embodiment, a first computing device 702 is illustrated to be in communication with a second computing device 752. The computing devices may communicate via a wired link 713 or via a wireless communication. The wired link may be via a direct wired link, or via a wired network such as a local area network, a wide area network, or an internet connection. Similarly, the wireless communication may be a direct wireless communication 715 such as a Bluetooth® link or an IEEE 802.11 peer to peer link. Alternatively, a connection between the first and second computing devices can be formed via a wireless network 705, such as an IEEE 802.11 wireless local area network, or a Third Generation Partnership Project (3GPP) wireless wide area network. Any type of desired wired or wireless network may be used to communicate the data, as can be appreciated.

In the example of FIG. 7, a contact transceiver module 754 can be configured to operate on the first and second computing devices. For purposes of clarity, a first user is associated with the first computing device 702 and a second user is associated with the second computing device 752. In this example, the second computing device 752 is configured to receive the communication contact information of the first user from the first user's computing device. The communication contact information can be linked to a personal identification key (i.e. the personal identifier and/or uuid) associated with the first user's computing device.

A contact manager module 756, which is in communication with the second computing device 752, can be configured to add a link to a personal identification key associated with the second user. Upon receiving the communication contact information of the first user at the second computing device 752, additional information can be added to or associated with the communication contact information. The additional information can be used to show that the second user has received the first user's communication contact information from the first user by adding a uuid to a "shared from" and a "shared to" field. In one embodiment, the "shared from" field can be added by the sender, to allow the sender to attach the sender's uuid to the communication contact information element that is sent. The receiving party can then add a uuid to the "shared to" field, based on the information obtained from the computing device of the receiving party. In one embodiment, the personal identification key, such as the uuid, can be communicated by a communication module 758 to the other computing device using the wired or wireless communication link. The link may be encrypted or the uuid scrambled in a fashion that can reduce or eliminate potential security threats to the personal identification key.

In one embodiment, the communication module can communicate with a server 716. A communication contact database 712 can be maintained that enables the computing device to identify an ownership chain of each communication contact information element. For example, as previously discussed, the "shared to" and "shared from" information for each communication contact information element can be stored in the communication contact database, and accessed by the first and second computing devices.

Figure 8:
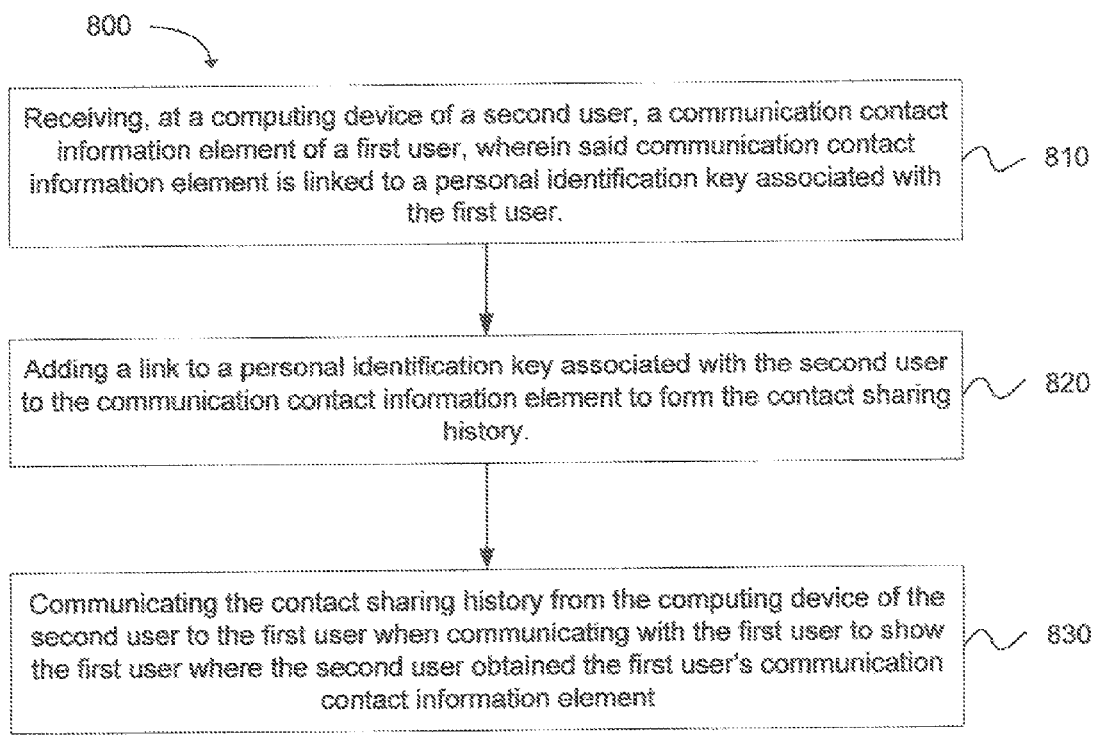
FIG. 8 depicts a flow chart of a method for constructing a contact sharing history in accordance with an embodiment of the present invention.

In another embodiment, a method 800 for constructing a contact sharing history is disclosed, as depicted in the flow chart of FIG. 8. The method comprises receiving, at a computing device of a second user, a communication contact information element of a first user, as shown in block 810. The communication contact information element is linked to a personal identification key associated with the first user. In block 820, a link to a personal identification key associated with the second user is added to the communication contact information element to form the contact sharing history. In block 830, the contact sharing history can be communicated form the computing device of the second user to the first user when communicating with the first user to show the first user where the second user obtained the first user's communication contact information element.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for constructing a contact sharing history, comprising:
    receiving, at a computing device of a second user, a communication contact information element of a first user, wherein said communication contact information element is linked to a personal identification key associated with the first user;
    adding a link to a personal identification key associated with the second user to the communication contact information element to form the contact sharing history; and
    communicating the contact sharing history from the computing device of the second user to a computing device of the first user when communicating with the first user to show the first user where the second user obtained the first user's communication contact information element.

2. The method of claim 1, wherein adding the link to the personal identification key associated with the second user further comprises:
    adding the link to the personal identification key associated with the second user to the communication contact information element on the second user's computing device; and
    adding a link to the personal identification key associated with the second user to the communication contact information element on the first user's computing device.

3. The method of claim 1, further comprising:
    communicating the communication contact information element of the first user from the computing device of the second user to a computing device of an additional user;
    sending the contact sharing history for the communication contact information element to the computing device of the additional user;
    adding a link to a personal identification key associated with the additional user to the contact sharing history at the computing device of the additional user; and
    communicating the contact sharing history from the computing device of the additional user to the computing device of the first user when communicating with the first user to show the first user where the additional user obtained the first user's personal contact information.

4. The method of claim 3, further comprising adding a link to a personal identification key associated with the additional user to the contact sharing history of the first user when the communication contact information element of the first user is shared with the additional user to allow the first user to identify when the first user's personal contact is shared.

5. The method of claim 3, further comprising: communicating the communication contact information element of the first user from the computing device of the second user to the computing device of the additional user only after receiving permission to share from the first user, wherein the permission can be received from one of a computing device of the first user and a network accessible location.

6. The method of claim 1, further comprising identifying, by the first user, with whom the second user has shared the first user's contact information, via the contact sharing history on the second user's computing device.

7. The method of claim 6, further comprising identifying, by the first user, with whom the second user has shared the first user's contact information, via the contact sharing history that is stored at a network accessible location.

8. A system for constructing a contact sharing history comprising:
one or more processors;
one or more memory coupled to the one or more processors, the one or more memory having instructions stored thereon, which when executed by the one or more processors, cause the system to perform operations comprising:
receiving, at a computing device of a second user, a communication contact information element of a first user from the first user's computing device, wherein the communication contact information element is linked to a personal identification key associated with the first user;
adding a link to a personal identification key associated with the second user to the communication contact information element to form the contact sharing history on the computing device of the second user; and
communicating the contact sharing history from the computing device of the second user to the computing device of the first user when communicating with the first user to enable the first user to determine where the second user obtained the first user's communication contact information element.

9. The system of claim 8, further comprising instructions, which when executed by the one or more processors, cause the system to:
receive, at a third user's computing device, the communication contact information element of the first user from the second user;
receive, at the computing device of the third user, the contact sharing history of the communication contact information element and add a link to a personal identification key associated with the third user to the contact sharing history for the communication contact information element at the computing device of the third user; and
communicate the contact sharing history from the third user's computing device to the first user's computing device when communicating with the first user, to enable the first user to determine where the third user obtained the first user's communication contact information element.

10. The system of claim 8, further comprising a server contact manager operable to:
operate on a server in communication with the first user and the second user; and
store the contact sharing history for the communication contact information element of first user.

11. The system of claim 10, wherein the server contact manager is further configured to:
receive a report from one of the contact manager on the computing device of the second user or the first user that the communication contact information element is shared;
receive the personal identification key associated with the user sharing the communication contact information element; and
receive the personal identification key associated with the user receiving the communication contact information element.

12. The system of claim 9, wherein the personal identification key of each of the first user, the second user and the additional user includes an authentication key to substantially secure each personal identification key.

13. A computer program product, comprising a non-transitory computer usable medium having a computer readable program code embodied therein, said computer readable program code adapted to be executed to implement a method for constructing a contact sharing history, the method comprising:
receiving, at a computing device of a second user, a communication contact information element of a first user, from a computing device of the first user, wherein said communication contact information element is linked to a personal identification key associated with the first user;
adding a link to a personal identification key associated with the second user to the communication contact information element to form the contact sharing history; and
communicating the contact sharing history from the computing device of the second user to the first user when communicating with the first user, to show the first user where the second user obtained the first user's communication contact information element.

14. The computer program product of claim 13, wherein adding the link to the personal identification key associated with the second user further comprises:
adding the link to the personal identification key associated with the second user to the communication contact information element on the second user's computing device; and
adding a link to the personal identification key associated with the second user to the communication contact information element on the first user's computing device.

15. The computer program product of claim 13, wherein the method further comprises:
communicating the communication contact information element of the first user from the computing device of the second user to a computing device of an additional user;
sending the contact sharing history for the communication contact information element to the additional user;
adding a link to a personal identification key associated with the additional user to the contact sharing history at the computing device of the additional user; and
communicating the contact sharing history from the computing device of the additional user to the computing device of the first user, when communicating with the first user, to show the first user where the additional user obtained the first user's personal contact information.

16. The computer program product of claim 15, wherein the method further comprises: adding a link to a personal identification key associated with the additional user to the contact sharing history of the first user when the communication contact information element of the first user is shared with the additional user, to allow the first user to identify when the first user's personal contact is shared.

17. The computer program product of claim 13, wherein the method further comprises: identifying, by the first user, with whom the second user has shared the first user's contact information, via the contact sharing history on the second user's computing device.

18. The computer program product of claim 17, wherein the method further comprises: identifying, by the first user, with whom the second user has shared the first user's contact information, via the contact sharing history that is stored at a network accessible location.

* * * * *